March 17, 1953   G. S. PADIAL   2,631,464
CHAIN-DRIVEN DIFFERENTIAL TRANSMISSION
FOR MOTOR VEHICLES
Filed Nov. 7, 1947   2 SHEETS—SHEET 2
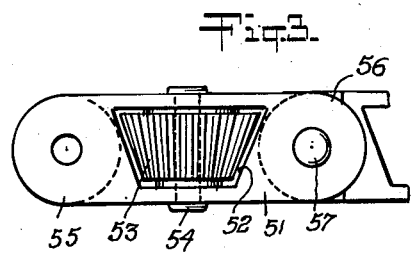
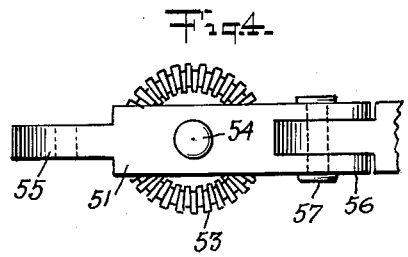
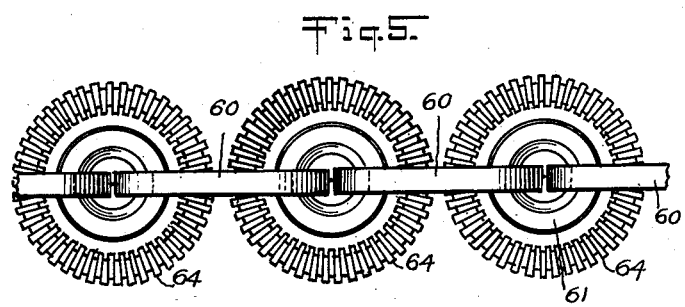
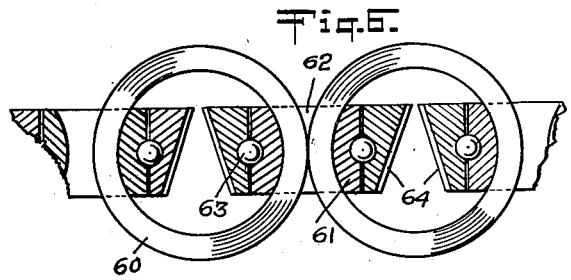
INVENTOR.
Guillermo Solomon Padial
BY
Munn, Liddy & Glaccum
Attorneys Patented Mar. 17, 1953

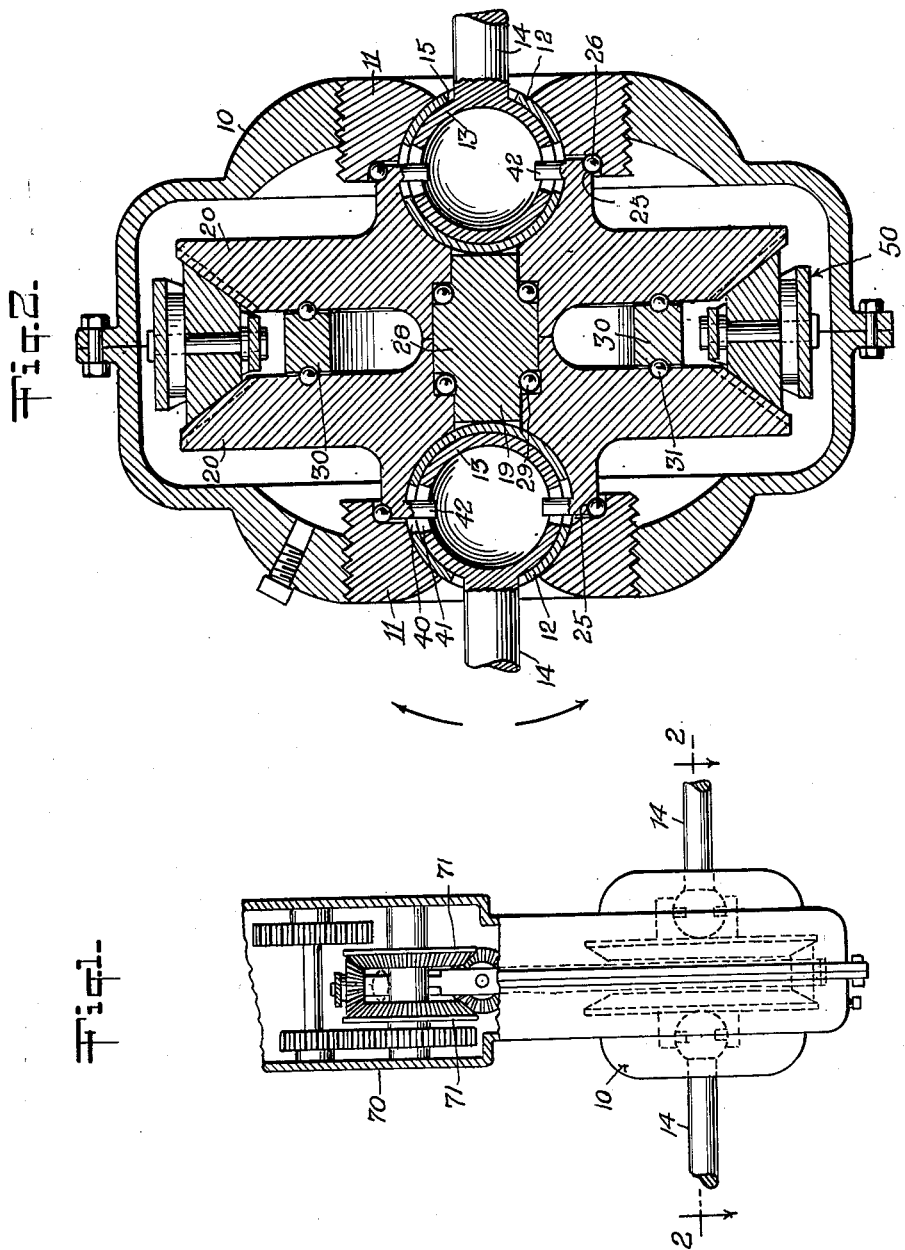

2,631,464

UNITED STATES PATENT OFFICE 2,631,464

CHAIN-DRIVEN DIFFERENTIAL TRANSMISSION FOR MOTOR VEHICLES

Guillermo Solomon Padial, Caracas, Venezuela

Application November 7, 1947, Serial No. 784,688

2 Claims. (Cl. 74—250)

This invention relates to a chain-driven differential transmission for use in automobiles and other types of motor vehicle as well as for use in other motor-driven mechanisms.

The principal object of this invention is the provision of a differential transmission of the character described in which the chain drive is the key element in the differential system. It is accordingly a principal object of this invention to provide a novel type of chain which may be used for the purpose indicated.

Another principal object of this invention is the provision of an exceedingly flexible connection between the differential transmission and the driving axles of the motor vehicle.

The invention generally includes a novel series of links of a drive chain in which the links are pivotally related to each other and support transmission elements preferably beveled, such as beveled pinions. This chain, in one form, is adapted to be associated with driving mechanism of any suitable kind, such as in an automobile, as well as with the rear axles thereof. The bevel transmission elements on the chain are associated with pairs of similarly beveled transmission elements in the driving mechanism of the automobile and associated with the rear axles thereof.

A preferred embodiment of the invention is shown in the drawings, of which:

Fig. 1 is an elevation partly in section of the differential transmission forming the subject matter of this application and the transmission train by which it is driven;

Fig. 2 is an enlarged section on the line 2—2 of Fig. 1;

Fig. 3 is a detailed side view of one of the links of the chain by which the differential transmission is driven;

Fig. 4 is a plan view thereof showing how one link is connected to an adjoining link;

Fig. 5 is a view similar to that of Fig. 4 of a modified type of chain link including a modified means of joining such links together; and Fig. 6 is a fragmentary view, partly in section, taken on a plane which intersects the plane of Fig. 5 at right angles thereto showing how the links are joined to each other.

The differential mechanism herein shown includes a housing 10 in which two bearing supports are mounted. It will be noted that these bearing supports are each provided with a socket on their inner, facing sides, and that in each of said sockets is a hollow sphere 12. Mounted in each sphere 12 is a ball-shaped member 13 and connected to each ball-shaped member 13 is an axle or drive shaft 14. It will be seen that the two drive shafts 14 are in axial alignment with each other and that they project through relatively large openings 15 in spheres 12. There is considerable clearance between the drive shafts or axles 14 and the edges of the openings 15 so that relative movement between ball-shaped members 13 and the drive shafts which are connected thereto on the one hand, and the spheres 12 on the other, may be had. It will be seen from the foregoing that the hollow spheres 12 serve as sockets in a ball and socket construction with the balls 13.

A pair of beveled transmission elements such as gear wheels 20 are mounted on a shaft 19 disposed between the two hollow spheres 12. Formed in the far sides of beveled gear wheels 20 are sockets which cooperate with the sockets in the bearing supports 11 to accommodate hollow spheres 12. It will be noted in Fig. 2 that the sockets in the gear wheels 20 complement the sockets in the bearing supports 11 to form substantially spherical sockets adapted to accommodate the hollow spheres 12. These parts constitute another ball and socket construction in which the hollow spheres 12 constitute the ball, and the sockets in members 11 and 20 constitute the socket. Actually the hollow spheres 12 serve as spherical sleeves or anti-friction bearings between the ball-shaped members 13 and the members 11 and 20. Annular grooves are formed on the peripheral edges 25 of the gear wheels 20. These annular grooves accommodate ball bearings 26, and it will be noted that these ball bearings engage bearing supports 11 to provide relatively frictionless contacts between the gear wheels 20 on the one hand and the bearing supports 11 on the other.

The shaft 19 is provided with a centrally located enlarged portion 28, and it will be seen that annular shoulders are thereby formed on both sides thereof. Ball bearings 29 are accommodated between these annular shoulders and adjacent portions of the gear wheels 20, and again it will be seen that a relatively frictionless bearing contact between the gear wheels 20 on the one hand and the shaft 19 on the other hand is thereby provided.

Ring-shaped member 30 is mounted between the two gear wheels 20, and it will be observed that registering grooves are formed in the facing sides of the gear wheels 20 and in the ring-shaped member 30. These grooves constitute races for ball bearings 31 so that a ball bearing spacer is thereby provided between the two gear wheels.

It will be apparent from the foregoing that gear wheels 20 are a pair of freely rotatable members which may be rotated independently of each other. They are supported on bearings 26 which roll in annular grooves formed in the bearing supporting members 11. Since these bearing supports are fixedly mounted in the housing 10, the gear wheels 20 are adapted to rotate on a fixed axis relative to said housing, transversely thereof.

Registering openings 40 and 41, respectively, are formed in hollow spheres 12 and ball members 13. Pins 42 are connected to the gear wheels 20, and it will be seen that these pins extend through the registering openings 40 and 41. There is considerable clearance between these pins and the sides of these openings, and hence an opportunity for relative movement between the hollow spheres 12 and the ball-shaped members 13 on the one hand, and the pins 42 on the other hand, is thereby afforded. Still such relative movement is limited by the shape and size of openings 40 and 41. These openings are longer than they are wide and their width corresponds to the diameter or thickness of pins 42. Accordingly, movement of ball members 13 and the drive shafts 14 which are connected thereto relative to the gear wheels 20 is limited to movement in the directions of the two arrows shown in Fig. 2. Aside from such relative movement between the ball members 13 and the shafts 14 on the one hand and the gear wheels 20 on the other hand, the pins 42 interlock said members so that rotary movement of the gear wheels causes a corresponding rotary movement of the drive shafts. It will also be noted from the foregoing that independent movement of the one gear wheel relative to the other is provided, and hence relative rotary movement of the one drive shaft relative to the other is also provided.

Engaging the two transmission wheels 20 is a gear chain 50, as shown in Fig. 2. This gear chain comprises a plurality of links 51, as shown in detail in Figs. 3 and 4. Each link has a cut-out 52 formed therein and in each such cut-out a beveled transmission element such as gear 53 is mounted on a pin 54. This beveled gear is an idler, being freely rotatable on its pin. It will be noted that one of the ends of link 51, to wit, end 55 is reduced and that the opposite end 56 is bifurcated. Both ends are perforated to receive a pin or rivet 57, and it will be noted that the reduced end 55 of any one link 51 is adapted to engage the bifurcated end 56 of its adjoining link. Pin 57 locks adjoining links together but enables them to move pivotally of each other.

Reference to Fig. 2 will disclose that idler gears 53 engage both gear wheels 20. It is accordingly a necessary result of such engagement that when the chain as a whole is caused to move, a corresponding movement of gear wheels 20 is effected. It may be, however, that by reason of a relatively stronger resistance to rotation on the part of one of the drive shafts 14, as compared with the other of said drive shafts, there will be a freer and faster rotation of the latter drive shaft and the gear wheel 20 to which it is connected than of the other drive shaft and its corresponding gear wheel. Such relative movement between the two gear wheels 20 is effected through the idler gear wheels 53. It is apparent from the foregoing that the relationship between the gear wheels 20 on the one hand and between said gear wheels and the idlers 53 on the other hand, is productive of a differential action such as obtains in a conventional differential transmission as applied to motor vehicles.

Another type of link which may be used in the present construction is shown in Figs. 5 and 6. In this construction rings 60 connect adjoining links. Each link comprises a member 61 which has an opening 62 formed therein, the opposing walls of said opening being convex to accommodate the concave inner walls of adjoining rings 60. Members 61 have an annular groove formed therein adapted to accommodate ball bearings 63. Beveled gear wheels 64 are provided with a sufficiently large central opening to accommodate members 61. An annular groove is formed in the wall of said opening in registration with the groove of members 61. The ball bearings 63 are accommodated by both grooves which form a race therefor. Relative rotary movement between gear wheel 64 and members 61 is accordingly provided. It should be noted that the gears 20 and 53, as well as the gears 64, are formed so that there will be a considerable amount of clearance between the teeth of these gears and the gears with which they mesh.

A gear box 70 is shown connected to the housing 10 of the differential transmission above described. It will be noted that beveled gear wheels 71 are provided which correspond to the beveled gear wheels 20 above mentioned. The gear chain 50 above described engages gear wheels 71 in precisely the same manner as it engages gear wheels 20. Gear wheels 71 are the driving gear wheels and gear wheels 20 are the driven gear wheels in the system under discussion.

The mechanism hereinabove described is especially suited to rear engine drives as applied to modern busses, trucks and automobiles. The entire unit herein described may be connected directly to the crank case of the motor and, indeed, the housing which encloses the mechanism shown in the drawing may itself constitute a part of the crank case of the engine.

It will be understood that the foregoing is a description intended to illustrate the invention herein claimed and not to limit it to the specific members shown in the drawing. For example, a specific type of beveled transmission element such as a gear wheel is shown in the drawing as being mounted on the gear chain. Other types of gear wheels may be incorporated into a gear chain of this type without modifying the essential principles of the invention. These gear wheels may be made of any suitable material such as solid or laminated steel or plastics material. The use to which the device will be put will determine the nature of the material and other aspects of the construction of these gear wheels. Although the mechanism herein described is shown hooked up to a pair of drive shafts such as are used in the rear axles of motor vehicles, it will be apparent that this, too, is by way of illustration rather than limitation.

I claim:

1. A gear chain comprising a plurality of interconnected links, each of said links comprising a centrally apertured member having an annular groove formed thereon on its outer periphery, a centrally apertured gear wheel having an annular groove formed therein on its inner periphery, said gear wheel being adapted to receive within its central aperture the grooved member, the grooves of the two members being in registration with each other and carrying within them a plurality of ball bearings which enable the two members to move rotatably with respect to each other, but prevent axial movement of the one relative to the other, said links being joined by means of rings which extend through the central apertures of adjoining grooved members.

2. A gear chain comprising a plurality of gear wheels having a central opening formed therein, axially thereof, the inner wall of each said gear wheel being provided with an annular groove formed therein, a plurality of substantially cylindrically shaped members, each of which is provided in its outer wall with an annular groove formed therein, the axial opening of the gear wheels being adapted to accommodate said cylindrically shaped members, the grooves of the gear wheels and the grooves of the cylindrical members being situated to enter into registration with each other, a plurality of ball bearings in said grooves which enable the gear wheels to rotate relatively to the cylindrical members and which prevent axial movement of the gear wheels relative to said cylindrical members, and a plurality of links interconnecting adjacent cylindrical members.

GUILLERMO SOLOMON PADIAL.

REFERENCES CITED

The following references are of record in the file of this patent:

UNITED STATES PATENTS

| Number | Name | Date |
|---|---|---|
| 543,719 | Berger | July 30, 1895 |
| 557,299 | Blaz | Mar. 31, 1896 |
| 691,908 | Little | Jan. 28, 1902 |
| 1,392,439 | Neuteboom | Oct. 4, 1921 |
| 1,446,069 | Root | Feb. 20, 1923 |
| 2,073,846 | Maurer | Mar. 16, 1937 |
| 2,102,973 | Porsche | Dec. 21, 1937 |
| 2,187,843 | Rzeppa | Jan. 23, 1940 |
| 2,242,963 | Wendling | May 20, 1941 |

FOREIGN PATENTS

| Number | Country | Date |
|---|---|---|
| 6,063 | Great Britain | Dec. 19, 1882 |
| 113,843 | Austria | Feb. 15, 1929 |
| 522,077 | France | July 25, 1921 |